US012195582B2

(12) United States Patent
Weis et al.

(10) Patent No.: US 12,195,582 B2
(45) Date of Patent: Jan. 14, 2025

(54) CONDUCTIVE POLYMER COMPOSITION (71) Applicant: PPG Industries Ohio, Inc., Cleveland, OH (US)

(72) Inventors: Jonathan G. Weis, Allison Park, PA (US); Shawn R. DeBerry, Cranberry Township, PA (US); W. David Polk, Pittsburgh, PA (US); Paul F. Cheetham, Wexford, PA (US); Darin W. Laird, Pittsburgh, PA (US); Kurt G. Olson, Gibsonia, PA (US); Thomas E. Decker, Pittsburgh, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 917 days.

(21) Appl. No.: 17/293,248

(22) PCT Filed: Nov. 12, 2019

(86) PCT No.: PCT/US2019/060909
§ 371 (c)(1),
(2) Date: May 12, 2021

(87) PCT Pub. No.: WO2020/102189
PCT Pub. Date: May 22, 2020

(65) Prior Publication Data
US 2022/0002475 A1 Jan. 6, 2022

Related U.S. Application Data (60) Provisional application No. 62/760,456, filed on Nov. 13, 2018, provisional application No. 62/899,429, filed on Sep. 12, 2019.

(51) Int. Cl.
*C08G 63/16* (2006.01)
*C08G 63/85* (2006.01)
(Continued)

(52) U.S. Cl.
CPC ............ *C08G 63/16* (2013.01); *C08G 63/85* (2013.01); *C08K 3/04* (2013.01); *C09K 5/14* (2013.01);
(Continued)

(58) Field of Classification Search
CPC combination set(s) only.
See application file for complete search history.

(56) References Cited

U.S. PATENT DOCUMENTS 5,174,924 A 12/1992 Yamada et al.
6,452,476 B1 9/2002 Handa
(Continued)

FOREIGN PATENT DOCUMENTS

CN 101516980 A 8/2009
CN 106024229 A 10/2016
(Continued)

OTHER PUBLICATIONS

Stempfle et al., "Long-chain aliphatic polyesters from plant oils for injection molding, film extrusion and electrospinning", Green Chemistry, 2014, pp. 2008-2014, vol. 16.
(Continued)

*Primary Examiner* — Nicole M. Buie-Hatcher
(74) *Attorney, Agent, or Firm* — Krisanne Shideler (57) ABSTRACT

An electrically or thermally conductive polymer composition, includes: a polyester polymer having a backbone including at least 12 consecutive carbon atoms between ester linkages; and conductive particles dispersed in the polyester polymer. A component including an electrically or thermally conductive polymer composition is also disclosed. A method for self-regulating a temperature of a component is also disclosed.

23 Claims, 3 Drawing Sheets (51) Int. Cl.
*C08K 3/04* (2006.01)
*C09K 5/14* (2006.01)
*H01B 1/24* (2006.01)
*H05B 3/14* (2006.01)

(52) U.S. Cl.
CPC ............... *H01B 1/24* (2013.01); *H05B 3/146* (2013.01); *C08G 2250/00* (2013.01); *C08K 2201/001* (2013.01)

(56) References Cited

U.S. PATENT DOCUMENTS

| | | | |
|---|---|---|---|
| 8,552,101 | B2 | 10/2013 | L'Abee et al. |
| 8,552,102 | B2 | 10/2013 | Noami et al. |
| 9,349,510 | B2 | 5/2016 | Lo et al. |
| 2008/0009572 | A1 | 1/2008 | Khatua et al. |
| 2008/0044753 | A1* | 2/2008 | Hirota ............... G03G 9/08795 430/137.15 |
| 2011/0297891 | A1 | 12/2011 | Mercx et al. |
| 2015/0353753 | A1 | 12/2015 | Lockett et al. |
| 2016/0035468 | A1 | 2/2016 | Lo et al. |
| 2018/0223096 | A1* | 8/2018 | Kim ............... F21S 45/48 |

FOREIGN PATENT DOCUMENTS

| | | | | |
|---|---|---|---|---|
| EP | 0328711 | A1 * | 8/1989 | |
| EP | 0460790 | A1 | 12/1991 | |
| GB | 1457157 | A * | 11/1976 | ............... C08K 3/04 |
| JP | 2014-214181 | A | 11/2014 | |
| RU | 2611512 | C2 | 2/2017 | |

OTHER PUBLICATIONS

Florian Stempfle et al: "Long Chain Aliphatic Polyesters from Plant Oils for Injection Molding, Film Extrusion and Electrospinning", Green Chemistry, vol. 16, No. 4, Jan. 1, 2014, pp. 2008-2014.

* cited by examiner

CONDUCTIVE POLYMER COMPOSITION

FIELD OF THE INVENTION

The present invention relates to conductive polymer compositions, a component including the same, and a method for self-regulating a temperature of a component.

BACKGROUND OF THE INVENTION

Heating systems, such as in automobiles or other heated components are expensive resistive heating arrays that utilize a separate controller for current management, particularly in an overcurrent management situation. Should the controller fail, however, the temperature created by the heating system cannot be safely managed. Moreover, in the context of heating systems in automobiles, heating sourced from heat generated by combustion engine cars will not be available for electric cars.

SUMMARY OF THE INVENTION

The present invention is directed to an electrically or thermally conductive polymer composition, including: a polyester polymer having a backbone with having at least 12 consecutive carbon atoms between ester linkages; and conductive particles dispersed in the polyester polymer.

The present invention is also directed to a component including an electrically or thermally conductive polymer composition, including: two electrodes; and an electrically or thermally conductive polymer composition in electrical communication with the two electrodes, the conductive polymer composition including: a polyester polymer having a backbone having at least 12 consecutive carbon atoms between ester linkages; and conductive particles dispersed in the polyester polymer.

The present invention is also directed to a method for self-regulating a temperature of a component, including: providing a component including an electrically or thermally conductive polymer composition, the component including: two electrodes; and an electrically or thermally conductive polymer composition in electrical communication with the two electrodes, the conductive polymer composition including: a polyester polymer having a backbone having at least 12 consecutive carbon atoms between ester linkages; and conductive particles dispersed in the polyester polymer.

DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" conductive polymer composition, "a" component, and the like refer to one or more of any of these items. Also, as used herein, the term "polymer" is meant to refer to prepolymers, oligomers, and both homopolymers and copolymers. The term "resin" is used interchangeably with "polymer".

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

The present invention is directed to an electrically or thermally conductive polymer composition, comprising: (a) a polyester polymer having a backbone comprising at least 12 consecutive carbon atoms between ester linkages; and (b) conductive particles dispersed in the polyester polymer.

The polyester polymer may include a backbone comprises at least 12 consecutive carbon atoms between ester linkages (the count of consecutive carbons including the carbon forming a part of the ester linkage), such as at least 14, at least 16, at least 18, or at least 20 consecutive carbon atoms between ester linkages. The backbone with the consecutive carbon chain may include a repeating carbon-containing unit, such as consecutive methylene groups. The backbone with the consecutive carbon chain may contain a mix of carbon-containing units, such as a mix of methylene and carbonyl groups.

The polyester polymer may include the following chemical structure:

where n≥1, X is incorporated through any polyol, and R is any component, including H.

The polyester polymer may include the following chemical structure:

where n≥1, Y is derived from any polyacid (including polyacid halide), polyester, or the like, and R is any component, including H.

The polyester polymer may have a linear structure. As used herein, the term "linear structure" refers to a straight chain polymer free of branches forming off of the straight chain. The polyester polymer may be substantially free of branching, such that the degree of branching of the polyester polymer is less than a level that would decrease the endotherm (glass transition endotherm or melting endotherm) by 50% compared to the completely linear polyester polymer. The glass transition endotherm and the melting endotherm are measured according to ASTM D3418. To determine the glass transition endotherm or the melting endotherm, a specimen of each sample was sealed in an aluminum hermetic pan and scanned twice in a TAI Discovery DSC from −30 to 250° C. at 10° C./min. The DSC was calibrated with indium, tin and zinc standards and the nominal nitrogen purge rate was 50 mL/min. The half-height glass transition temperatures (Tg) were determined by two points and the peak areas were determined using a linear baseline.

The polyester polymer may include a non-aromatic polyester polymer. As used herein, the term "non-aromatic polyester polymer" refers to a polyester polymer free of aromatic groups. As used herein, the term "aromatic group" refers to a cyclic, planar molecule with a ring of resonance bonds that exhibits more stability than other geometric or connective arrangements with the same set of atoms.

The polyester polymer may include a saturated polyester polymer. As used herein, the term "saturated polyester polymer" refers to a polyester polymer in which all atoms are linked by single bonds, excluding the ester linkage. The polyester polymer may be an unsaturated polyester polymer having one or two degrees of unsaturation, excluding ester linkages.

The polyester polymer may include a semi-crystalline polyester polymer. As used herein, the term "semi-crystalline polyester polymer" refers to a polyester polymer containing both crystalline regions and amorphous regions.

The polyester polymer may include a bio-based polyester polymer. As used herein, the term "bio-based polyester polymer" refers to a polyester polymer prepared at least partially from bio-based monomers. The polyester polymer may be prepared using a diacid monomer, which diacid monomer may be derived from plant or vegetable oil. The polyester polymer may be prepared using a polyol derived from plant or vegetable oil. The polyester polymer may be prepared using glycerin as the polyol.

The polyester polymer may be prepared from a reaction of a polyacid component and/or a polyester component with a polyol component. The polyacid component may include a diacid monomer. The polyacid component may include a polyacid halide. The polyester component may include a diester monomer.

As used herein, the term "polyacid" refers to a compound having two or more acid or acid equivalent groups (or combination thereof) and includes the ester and or anhydride of the acid. By "acid equivalent groups", it is meant that the non-double bonded oxygen in the acid group has been substituted with another component, such as a halide component. Thus, the polyacid may include a polyacid halide or other polyacid equivalent. "Diacid" refers to a compound having two acid groups and includes the ester and or anhydride of the diacid. As used herein, the term "polyester" refers to a compound having two or more ester groups. "Diester" refers to a compound having two ester groups. As used herein, the term "polyol" refers to a compound having two or more hydroxyl groups.

The polyester polymer may be a reaction product of a polyol with a polyacid (e.g., a diacid) including an at least 12 consecutive carbon atom chain, such as an at least 14, at least 16, at least 18, or at least 20 consecutive carbon atom chain. The polyester polymer may be a reaction product of a polyol with a polyester (e.g., a diester) including an at least 12 consecutive carbon atom chain, such as an at least 14, at least 16, at least 18, or at least 20 consecutive carbon atom chain. The polyester polymer may be a reaction product of a polyol including an at least 12 consecutive carbon atom chain, such as at least 14, at least 16, at least 18, or at least 20 consecutive carbon atom chain and a polyester or polyacid. Thus, the polyester polymer may include a polyester polyol polymer and/or a polyester polyacid polymer.

Suitable polyacids for preparation of the polyester polymer include, but are not limited to, saturated polyacids such as adipic acid, azelaic acid, sebacic acid, succinic acid, glutaric acid, octadecanedioic acid, hexadecanedioic acid, tetradecanedioic acid, decanoic diacid, dodecanoic diacid, cyclohexanedioic acid, hydrogenated C36 dimer fatty acids, and esters and anhydrides thereof. Suitable polyacids include polyacid halides. The polyacid may comprise from 20 to 80 weight percent of the reaction mixture, such as from 30 to 70 weight percent or from 40 to 60 weight percent. Combinations of any of these polyacids may be used.

Suitable polyesters for preparation of the polyester polymer include, but are not limited to esters of the above-listed suitable polyacids. The polyester may comprise from 20 to 80 weight percent of the reaction mixture, such as from 30 to 70 weight percent or from 40 to 60 weight percent. Combinations of any of these polyesters may be used.

Suitable polyols for preparation of the polyester polymer include, but are not limited to any polyols known for making polyesters. Examples include, but are not limited to, alkylene glycols, such as ethylene glycol, propylene glycol, diethylene glycol, dipropylene glycol, 1,2-propylene glycol, triethylene glycol, tripropylene glycol, hexylene glycol, polyethylene glycol, polypropylene glycol and neopentyl glycol; hydrogenatedbisphenol A; cyclohexanediol; propanediols including 1,2-propanediol, 1,3-propanediol, butyl ethyl propanediol, 2-methyl-1,3-propanediol, and 2-ethyl-2-butyl-1,3-propanediol; butanediol s including 1,4-butanediol, 1,3-butanediol, and 2-ethyl-1,4-butanediol; pentanediols including trimethyl pentanediol and 2-methylpentanediol; 2,2,4-trimethyl-1,3-pentanediol, cyclohexanedimethanol; hexanediol s including 1,6-hexanediol; 2-ethyl-1,3-hexanediol, caprolactonediol (forexample, the reaction product of epsilon-caprolactone and ethylene glycol); hydroxyalkylated bisphenols; polyether glycols, for example, poly(oxytetramethylene) glycol; trimethylol propane, di-trimethylol propane, pentaerythritol, di-pentaerythritol, trimethylol ethane, trimethylol butane, dimethylol cyclohexane, glycerol, tris(2-hydroxyethyl) isocyanurate and the like.

Combinations of any of these polyols may be used to form at least one polyester polymer used in the conductive polymer composition. The conductive polymer composition may include a plurality of different types of polyester polymers, each polyester polymer prepared using a different polyol and/or combination of polyols (see Example 7). The conductive polymer composition may include a single type of polyester polymer, with the polyester polymer prepared including a plurality of different types of polyols (see Example 8). The combination of polyols (used to prepare the single or multiple polyester polymers for inclusion in the conductive polymer composition) may include, as non-limiting examples, at least one of 1,2 butane diol, 1,3 butane diol, 1,4 butane diol, and 1,6 hexane diol.

The polyester polymer itself (of the conductive polymer composition) may be a non-conductive polymer.

The polyester polymer may include at least 5 weight percent of the total weight of the conductive polymer composition, such as at least 10 weight percent, at least 20 weight percent, or at least 30 weight percent. The polyester polymer may include up to 40 weight percent of the total weight of the conductive polymer composition, such as up to 30 weight percent, up to 20 weight percent, or up to 10 weight percent. The polyester polymer may include from 5 to 40 weight percent of the conductive polymer composition, such as from 10 to 30 weight percent or from 10 to 20 weight percent.

The polyester polymer may include at least 25 weight percent of the weight of the conductive polymer composition based on total solids, such as at least 30 weight percent, at least 40 weight percent, or at least 50 weight percent. The polyester polymer may include up to 60 weight percent of the weight of the conductive polymer composition based on total solids, such as up to 50 weight percent, up to 45 weight percent, or up to 40 weight percent. The polyester polymer may include from 25 to 60 weight percent of the weight of the conductive polymer composition based on total solids, such as from 30 to 60 weight percent or from 40 to 50 weight percent.

The polyester polymer may be included in the conductive polymer composition with other polymers. The polyester polymer may be incorporated as a segment of a polymer included in the conductive polymer composition. For example, the polyester polymer may be reacted with an isocyanate to form a polyurethane polymer comprising the polyester polymer as a segment thereof (still a polyester polymer as well). The polyester segment of the polyurethane polymer would still result in PTC performance of the polymer, as the polyester segment would still expand at critical temperatures.

The conductive particles may be dispersed in the polyester polymer to form the conductive polymer composition. By "dispersed in", it is meant that the conductive particles are provided in and around the polyester polymer, but are not a component of the polyester polymer. The conductive particles may be any suitable conductive particle sufficient for conducting electricity through the conductive polymer composition at certain operating conditions.

Suitable conductive particles include, but are not limited to conductive carbonaceous material, such as carbon black, carbon nanotubes, graphite, graphite/carbon, graphitized carbon black, or other graphenic particles that would not shear exfoliate into sheets during processing. Other suitable conductive particles may include nickel powders, silver (e.g., silver nanowires), copper, silver-coated copper, aluminum, metallized carbon black, metal particles covered with different metals, ceramic conductive particles such as titanium nitride, titanium carbide, molybdenum silicide, tungsten carbide, potassium titanate whiskers, gold powder, tungsten, molybdenum, cobalt, zinc, or some combination thereof.

The conductive particles may have a structure, as measured by Oil Absorption Number (OAN) within the range of 345 cc/100 g to 60 cc/100 g as measured by ASTM D2414. The conductive particles may have a porosity of from 800 $m^2/g$ to 11 $m^2/g$, as measured by total and external surface area according to ASTM D6556 and/or ASTM D3037.

The conductive particles may include at least 30 weight percent of the conductive polymer composition, based on the weight of only the polyester polymer and the conductive particles, such as at least 40 weight percent, at least 50 weight percent, or at least 60 weight percent. The conductive particles may include up to 70 weight percent of the conductive polymer composition, based on the weight of only the polyester polymer and the conductive particles, such as up to 60 weight percent, up to 50 weight percent, or up to 40 weight percent. The conductive particles may include from 30 to 70 weight percent of the conductive polymer composition, based on the weight of only the polyester polymer and the conductive particles, such as from 40 to 60 weight percent or from 40 to 50 weight percent.

The polyester polymer and the conductive particles may be dispersed in a solvent to prepare the conductive polymer composition. Suitable solvents that can be used to dissolve or disperse the polyester polymer and/or the conductive particles include an organic solvent or mixtures thereof (a solvent blend). The solvent blend may comprises a blend of diacetone alcohol and methylnaphthalene. The solvent may disperse the polyester polymer and/or the conductive particles at room temperature (20° C.-27° C.) such that they do not fall out of solution after being held for 30 minutes at 40° C. and/or after being held for 3 hours at 60° C.

The solvent or solvent blend may exhibit a Hansen solubility parameter ($\delta$) of from 17.0 to 21.5 $(J/cm)^{1/2}$, such as from 19 to 21 $(J/cm)^{1/2}$ or from 19.5-20.5 $(J/cm)^{1/2}$ or from 19.8 to 20.5 $(J/cm)^{1/2}$. For each chemical molecule (e.g., chemical molecule of the solvent), three Hansen parameters are given, each measured in $Mpa^{0.5}$: $\delta_d$, the energy from dispersion bonds between molecules; $\delta_p$, the energy from polar bonds between molecules; and $\delta_h$, the energy from hydrogen bonds between molecules. These three Hansen parameters are used to determine the Hansen solubility parameter based on the following equation:

$$\delta^2 = \delta_d^2 + \delta_p^2 + \delta_h^2$$

The Hansen parameters for dispersive, polar, and hydrogen-bonding components for calculating the Hansen solubility parameter are available in the commercially available HSPiP software.

The conductive polymer composition may have a pigment to binder (P:B) ratio of from 0.5 to 2, such as 0.6 to 1.5 or from 0.6 to 1.1.

The conductive polymer composition may exhibit a trip temperature in a range between 20° C. and 120° C., such as between 30° C. and 100° C., 40° C. and 95° C., 50° C. and 90° C., 60° C. and 90° C., 30° C. and 70° C., 35° C. and 65° C., or 40° C. and 60° C. Trip temperature refers to the temperature at which a maximum slope is exhibited in a graph of normalized resistance over temperature for the conductive polymer composition (see "Steepest Rise" and "Temperature for Steepest Rise" from the Examples included hereinafter). The conductive polymer composition may exhibit a narrow endotherm, which refers to the conductive polymer composition having an R65° C./R25° C.

and/or an R85° C./R25° C. (as defined in the examples below) value of at least 5, such as at least 8, at least 10, at least 12, at least 15, or at least 20. The conductive polymer composition may have an R45° C./R25° C. and/or a R65° C./R25° C. and/or a R85° C./R25° C. value of from 5 to 50, such as from 5 to 30, from 5 to 20, from 5 to 15, from 5 to 10, from 10 to 50, from 10 to 30, from 10 to 20, from 10 to 15, from 15 to 50, from 15 to 30, from 15 to 20, from 20 to 50, or from 20 to 30.

The conductive polymer composition may be thermally and/or electrically conductive. As used herein, "thermally conductive" means a material having a thermal conductivity of at least 0.5 W/m*K at conditions below the trip temperature. Thermal conductivity is measured according to ASTM D5470. As used herein, "electrically conductive" means a material having an electrical volume resistivity of less than 20 kΩ/sq/mil at conditions below the trip temperature when substantially all (at least 99%) solvent from the conductive polymer composition has been removed. Electrical volume resistivity is calculated by screen printing the conductive polymer composition on a 600 square serpentine. A point to point resistance of the serpentine is measured and a film height is recorded utilizing a SURFCOM 130A Profilometer.

Figure 1:
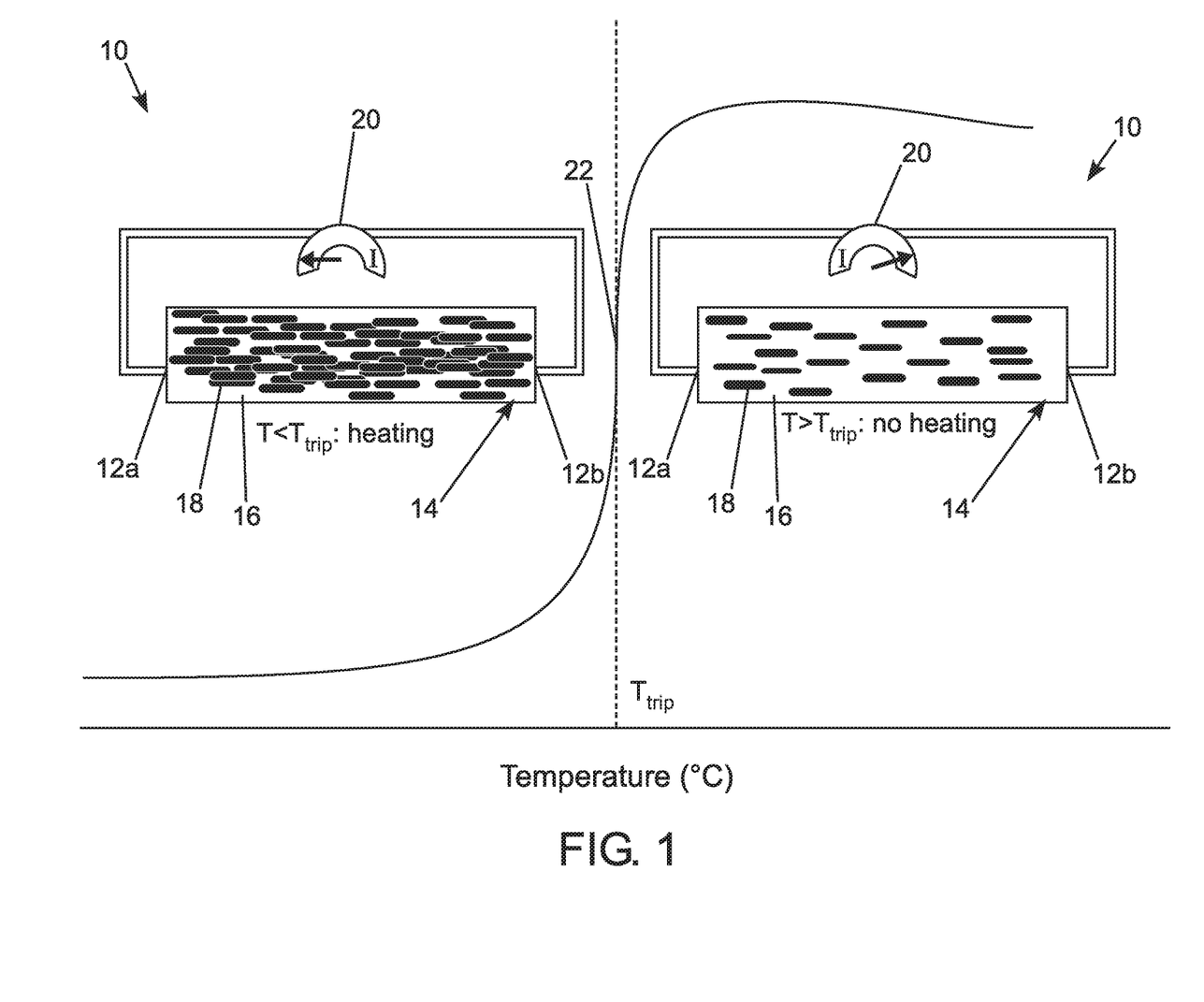
FIG. 1 shows a schematic view of a component comprising an electrically or thermally conductive polymer composition.

Referring to FIG. 1, a component 10 including the conductive polymer composition 14 is shown. The component 10 may include two electrodes 12a, 12b in contact with (in electrical communication with) the conductive polymer composition 14. The conductive polymer composition 14 may include the polyester polymer 16 and the conductive particles 18 dispersed in the polyester polymer 16. The component 10 may further include a power source 20 configured to flow a current through the conductive polymer composition 14 via the electrodes 12a, 12b at certain operating conditions of the component 10. Thus, the power source 20 may be in electrical communication with the electrodes 12a, 12b and the conductive polymer composition 14.

With continued reference to FIG. 1, the component 10 is shown at operating conditions before a trip temperature 22 is reached, at which the conductive polymer composition conducts current from the power source 20 (diagram left of the trip temperature 22) and at operating conditions after heating the component 10 so that the trip temperature 22 is reached, at which the conductive polymer composition does not conduct current from the power source 20 (diagram right of the trip temperature 22). Before the trip temperature 22, the conductive particles 18 dispersed in the polyester polymer 16 of the conductive polymer composition 14 may be in sufficient contact, such that the conductive polymer composition 14 conducts the current provided by the power source 20 through the contacting conductive particles. After heating the component 10 above the trip temperature 22, the polyester polymer 16 of the conductive polymer composition 14 has expanded a sufficient amount (compared to below the trip temperature) that the conductive particles 18 dispersed in the polyester polymer 16 of the conductive polymer composition 14 are not in sufficient contact, such that the conductive polymer composition 14 no longer conducts a current from the power source 20 therethrough so that no further heating occurs until the temperature falls below the trip temperature.

Therefore, based on the above-described arrangement, the component may self-regulate temperature without a separate controller based on the trip temperature 22 of the conductive polymer composition 14 acting as a self-controller.

The component including the conductive polymer composition may include a heating element or an overcurrent protection element. A heating element is an element that converts electrical energy into heat. An overcurrent protection element is a component that protects the component by opening a circuit when the current reaches a value that will cause an excessive or dangerous temperature rise in conductors. The heating element or overcurrent protection element may be a vehicle component, an architectural component, clothing (including shoes and other wearables), furniture (e.g., a mattress), a sealant, a battery enclosure, a medical component, a heating pad (and other therapeutic wearables), a fabric, an industrial mixing tank, and/or an electrical component. The vehicle component refers to any component included in a vehicle, such an automobile (e.g., an electric car and/or a car including an internal combustion engine), and may include, for instance, heated car components, such as steering wheels, arm rests, seats, floors headliners; battery packs optimizing battery temperature of batteries included the vehicle; external automotive heating components; and the like. The architectural component refers to any component included in structures, such as building, for instance, heated flooring, driveways, walls, ceilings, other components used in residential heating applications, and the like. The electrical component refers to any component associated with a device which conducts and/or generates electricity, such as battery enclosures/battery packs, a bus bar, and the like. The component is not limited to these examples, and it will be appreciated that the component including the conductive polymer composition may be any component in which temperature and/or current is to be controlled to prevent overheating of the component without requiring a separate controller component. The conductive polymer composition may be a printable dielectric over layer that provides protection from potential damage to the substrate over which it is applied.

The substrate onto which the conductive polymer composition may be applied may be made of any suitable material. The substrate may be, for example, metallic or non-metallic. The substrate may include tin, aluminum, steel, such as, tin-plated steel, chromium passivated steel, galvanized steel, or coiled steel, or other coiled metal, and any metallic alloys thereof. Examples of suitable materials for the substrate include organic materials, inorganic materials, and hybrid organic-inorganic materials. The substrate may include a thermoplastic polymer, a thermoset polymer, an elastomer, or a copolymer or other combination thereof, such as selected from polyolefins (e.g., polyethylene (or PE), polypropylene (or PP), polybutene, and polyisobutene), acrylate polymers (e.g., poly(methyl methacrylate) (or PMMA) type 1 and type 2), polymers based on cyclic olefins (e.g., cyclic olefin polymers (or COPs) and copolymers (or COCs), such as available under the trademark ARTON and ZEONORFILM), aromatic polymers (e.g., polystyrene), polycarbonate (or PC), ethylene vinyl acetate (or EVA), ionomers, polyvinyl butyral (or PVB), polyesters, polysulphones, polyamides, polyimides, polyurethanes, vinyl polymers (e.g., polyvinyl chloride (or PVC)), fluoropolymers, polysulfones, polylactic acid, polymers based on allyl diglycol carbonate, nitrile-based polymers, acrylonitrile butadiene styrene (or ABS), cellulose triacetate (or TAC), phenoxy-based polymers, phenylene ether/oxide, a plastisol, an organosol, a plastarch material, a polyacetal, aromatic polyamides, polyamide-imide, polyarylether, polyetherimide, polyarylsulfones, polybutylene, polyketone, polymethylpentene, polyphenylene, polymers based on styrene maleic anhydride, polymers based on polyallyl diglycol carbonate monomer, bismaleimide-based polymers, polyallyl phthalate, thermoplastic polyurethane, high density polyethylene, low density polyethylene, copolyesters (e.g., available under the trademark TRITAN), polyethylene terephthalate glycol (or PETG), polyethylene terephthalate (or PET), epoxy, epoxy-containing resin, melamine-based polymers, silicone and other silicon-containing polymers (e.g., polysilanes and polysilsesquioxanes), polymers based on acetates, polypropylene fumarate), poly(vinylidene fluoride-trifluoroethylene), poly-3-hydroxybutyrate polyesters, polycaprolactone, polyglycolic acid (or PGA), polyglycolide, polyphenylene vinylene, electrically conductive polymers, liquid crystal polymers, poly(methyl methacrylate) copolymer, tetrafluoroethylene-based polymers, sulfonated tetrafluoroethylene copolymers, fluorinated ionomers, polymer corresponding to, or included in, polymer electrolyte membranes, ethanesulfonyl fluoride-based polymers, polymers based on 2-[1-[difluoro-[(trifluoroethenyl)oxy]methyl]-1,2,2,2-tetrafluoroethoxy]-1,1,2,2,-tetrafluoro-, with tetrafluoro ethylene, tetrafluoroethylene-perfluoro-3,6-dioxa-4-methyl-7-octenesulfonic acid copolymer, polyisoprene, polyglycolide, polyglycolic acid, polycaprolactone, polymers based on vinylidene fluoride, polymers based on trifluoroethylene, poly(vinylidene fluoride-trifluoroethylene), polyphenylene vinylene), polymers based on copper phthalocyanine, cellophane, cuprammonium-based polymers, rayon, and biopolymers (e.g., cellulose acetate (or CA), cellulose acetate butyrate (or CAB), cellulose acetate propionate (or CAP), cellulose propionate (or CP), polymers based on urea, wood, collagen, keratin, elastin, nitrocellulose, plastarch, celluloid, bamboo, bio-derived polyethylene, carbodiimide, cartilage, cellulose nitrate, cellulose, chitin, chitosan, connective tissue, copper phthalocyanine, cotton cellulose, elastin, glycosaminoglycans, linen, hyaluronic acid, nitrocellulose, paper, parchment, plastarch, starch, starch-based plastics, vinylidene fluoride, and viscose), or any monomer, copolymer, blend, or other combination thereof. Additional examples of suitable substrates include ceramics, such as dielectric or non-conductive ceramics (e.g., $SiO_2$-based glass; $SiO_x$-based glass; $TiO_x$-based glass; other titanium, cerium, and magnesium analogues of $SiO_x$-based glass; spin-on glass; glass formed from sol-gel processing, silane precursor, siloxane precursor, silicate precursor, tetraethyl orthosilicate, silane, siloxane, phosphosilicates, spin-on glass, silicates, sodium silicate, potassium silicate, a glass precursor, a ceramic precursor, silsesquioxane, metallasilsesquioxanes, polyhedral oligomeric silsesquioxanes, halosilane, sol-gel, silicon-oxygen hydrides, silicones, stannoxanes, silathianes, silazanes, polysilazanes, metallocene, titanocene dichloride, vanadocene dichloride; and other types of glasses), conductive ceramics (e.g., conductive oxides and chalcogenides that are optionally doped and transparent, such as metal oxides and chalcogenides that are optionally doped and transparent), and any combination thereof. Additional examples of suitable substrates include electrically conductive materials and semiconductors, such as electrically conductive polymers like poly(aniline), PEDOT, PSS, PEDOT-PSS, and so forth. The substrate may be, for example, n-doped, p-doped, or un-doped. Further examples of substrate materials include polymer-ceramic composite, polymer-wood composite, polymer-carbon composite (e.g., formed of ketjen black, activated carbon, carbon black, graphene, and other forms of carbon), polymer-metal composite, polymer-oxide, or any combination thereof. The substrate material may also incorporate a reducing agent, a corrosion inhibitor, a moisture barrier material, or other organic or inorganic chemical agent (e.g., PMMA with ascorbic acid, COP with a moisture barrier material, or PMMA with a disulfide-type corrosion inhibitor). The substrate may be a polymeric film, such as a polyester film, a PET film, a thermoplastic polyurethane (TPU), or a textile. Other suitable non-metallic substrates may include wood, veneer, wood composite, particle board, medium density fiberboard, cement, stone, leather (e.g., natural and/or synthetic), glass, ceramic, asphalt, and the like.

Figure 3:
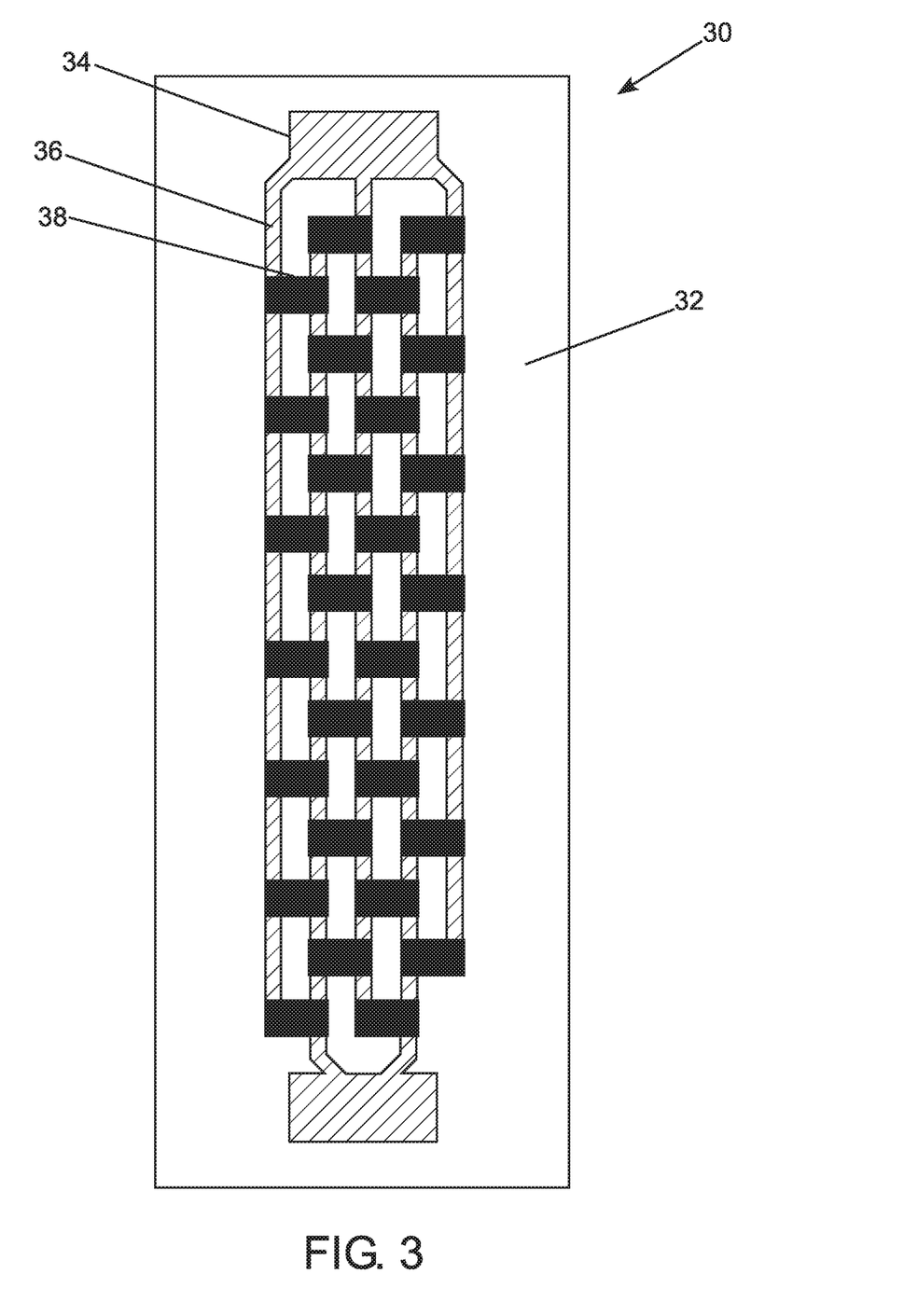
FIG. 3 shows a component including a conductive polymer composition.

Referring to FIG. 3, a component 30 including the conductive polymer composition is shown. The component 30 may include a substrate 32, such as any of the previously-described substrates. The component 30 may include a plurality of electrodes 34 functioning as terminals of the component and configured to place the conductive polymer composition in electrical communication with a power source. The electrodes 34 may be printed onto the substrate. The component 30 may include a conductive ink 36 electrically connected to at least one of the electrodes 34. The conductive ink 36 may be printed onto the substrate 32 in a pattern. The conductive ink 36 may be printed onto the substrate 32 in a number of segments, with at least one of the segments electrically connected to one of the electrodes 34 and another of the segments connected to the other of the electrodes 34 and with the segments of the conductive ink not in direct contact with one another. For example, as shown in FIG. 3, the segments of conductive ink 36 may include parallel lines of conductive 36 ink electrically connected to (in electrical communication with) alternating electrodes, with adjacent parallel lines not directly connected to one another by the conductive ink 36. The electrode 34 and the conductive ink 36 may be made of a same or different material. The electrode 34 and conductive ink 36 may be made of a conductive material. The electrode 34 and/or the conductive ink 36 may be made of the same or different conductive material and may be printed on the substrate 32 simultaneously. The conductive material may include at least one of silver, copper, or other conductive material, or some combination thereof.

With continued reference to FIG. 3, the component 30 may include the conductive polymer composition 38. The conductive polymer composition 38 may include a plurality of separate sections, with each section electrically connecting the previously-described separate segments of the conductive ink 36. As such, when below the trip temperature of the conductive polymer composition 38, the conductive polymer composition 38 completes the circuit, such that electricity can flow from one segment of the conductive ink 36 to the separate segment of the conductive ink 36 spanned by the conductive polymer composition 38. As such, when above the trip temperature of the conductive polymer composition 38, the conductive polymer composition 38 causes the circuit to be open (the conductive ink 36 segments are not in direct contact), such that electricity cannot flow from one segment of the conductive ink 36 to the separate segment of the conductive ink 36 spanned by the conductive polymer composition 38.

A method for self-regulating (regulating without requiring a separate controller) a temperature of a component may include providing the component including the conductive polymer composition. The method may further include flowing a current through the conductive polymer composition, such as by using a power source. To form the component capable of self-regulating its temperature, the conductive polymer composition may be applied onto a substrate of the component, such as by screen printing or other suitable application technique, such as rotogravure printing, flexographic printing, inkjet printing, or syringe dispensing.

The present invention further includes the subject matter of the following clauses:

Clause 1: An electrically or thermally conductive polymer composition, comprising: a polyester polymer having a backbone having at least 12 consecutive carbon atoms between ester linkages; and conductive particles dispersed in the polyester polymer.

Clause 2: The conductive polymer composition of clause 1, wherein the conductive polymer composition exhibits a trip temperature in a range between 20° C. and 120° C., wherein the trip temperature is a temperature at which a maximum slope is exhibited in a graph of normalized resistance over temperature for the conductive polymer composition.

Clause 3: The conductive polymer composition of clause 1 or 2, wherein the backbone comprises at least 18 consecutive carbon atoms.

Clause 4: The conductive polymer composition of any of clauses 1-3, wherein the polyester polymer comprises at least 10 weight percent of solids of the conductive polymer composition or at least 25 weight percent of solids of the conductive polymer composition.

Clause 5: The conductive polymer composition of any of clauses 1-4, wherein the polyester polymer has a linear structure.

Clause 6: The conductive polymer composition of any of clauses 1-5, wherein the polyester polymer comprises a non-aromatic polyester.

Clause 7: The conductive polymer composition of any of clauses 1-6, wherein the polyester polymer comprises a saturated polyester.

Clause 8: The conductive polymer composition of any of clauses 1-7, wherein the polyester polymer comprises a semi-crystalline polyester.

Clause 9: The conductive polymer composition of any of clauses 1-8, wherein the polyester polymer comprises a polyester polyol polymer or a polyester polyacid polymer.

Clause 10: The conductive polymer composition of any of clauses 1-9, wherein the polyester polymer is a reaction product of a polyol and a diacid or diester comprising an at least 12 consecutive carbon atom chain.

Clause 11: The conductive polymer composition of any of clauses 1-10, wherein the conductive particles comprise conductive carbon.

Clause 12: The conductive polymer composition of any of clauses 1-11, wherein the polyester polymer comprises a bio-based polyester.

Clause 13: The conductive polymer composition of any of clauses 1-12, wherein the polyester polymer and the conductive particles are dispersed in a solvent, wherein the solvent exhibits a Hansen solubility parameter of from 17.0 to 21.5 $(J/cm)^{1/2}$.

Clause 14: The conductive polymer composition of any of clauses 1-13, wherein the polyester polymer comprises a first polyester polymer having a backbone comprising at least 12 consecutive carbon atoms between ester linkages and a second polyester polymer having a backbone comprising at least 12 consecutive carbon atoms between ester linkages, wherein the first polyester polymer is different from the second polyester polymer.

Clause 15: The conductive polymer composition of any of clauses 1-14, wherein the polyester polymer is a reaction product of a plurality of polyols and a diacid or diester.

Clause 16: A component comprising an electrically or thermally conductive polymer composition, comprising: two electrodes; and an electrically or thermally conductive polymer composition in electrical communication with the two electrodes, the conductive polymer composition comprising: a polyester polymer having a backbone comprising at least 12 consecutive carbon atoms between ester linkages; and conductive particles dispersed in the polyester polymer.

Clause 17: The component of clause 16, wherein the component comprises a heating element or an overcurrent protection element.

Clause 18: The component of clause 17, wherein the heating element or overcurrent protection element comprises a vehicle component, an architectural component, clothing, a mattress, a sealant, a battery enclosure, a medical component, a heating pad, a fabric and/or an electrical component.

Clause 19: The component of any of clauses 16-18, further comprising a power source in electrical communication with the two electrodes.

Clause 20: The component of any of clauses 16-19, wherein the backbone comprises at least 18 consecutive carbon atoms.

Clause 21: The component of any of clauses 16-20, wherein the polyester polymer comprises at least 25 weight percent of solids of the conductive polymer composition.

Clause 22: A method for self-regulating a temperature of a component, comprising: providing a component comprising an electrically or thermally conductive polymer composition, the component comprising: two electrodes; and an electrically or thermally conductive polymer composition in electrical communication with the two electrodes, the conductive polymer composition comprising: a polyester polymer having a backbone comprising at least 12 consecutive carbon atoms between ester linkages; and conductive particles dispersed in the polyester polymer.

Clause 23: The method of clause 22, further comprising flowing a current through the electrically conductive polymer composition.

Clause 24: The method of clause 22 or 23, further comprising screen printing the conductive polymer composition onto a substrate.

EXAMPLES

The following examples are presented to demonstrate the general principles of the invention. The invention should not be considered as limited to the specific examples presented.

Examples A-H

Preparation of Polyester Polymers

Polymer A

A polyester polymer was prepared by adding 158.0 grams of octadecanedioic acid dimethyl ester (available from Elevance Renewable Sciences (Woodbridge, IL)), 56.27 grams of 1,2-propylene glycol, and 0.9 grams of butyl stannoic acid to a suitable reaction vessel equipped with a stirrer, temperature probe, and Dean-Stark trap with a condenser, under a nitrogen atmosphere. The contents of the reactor were gradually heated to 210° C. with continuous removal of methanol distillate beginning at about 150° C. The temperature of the reaction mixture was held at 210° C. until about 30 grams of methanol had been collected. The final resin solution had a measured percent solids (110° C./1 hour), as described in ASTM D2369, of about 100%, and a hydroxyl value of 40.0 mg KOH/g, determined by ASTM D4274. Gel permeation chromatography was used with tetrahydrofuran solvent and polystyrene standards to determine a weight average molecular weight (Mw) of 6033 g/mol. Mw and/or Mn, as reported herein, was measured, unless otherwise indicated, by gel permeation chromatography using a polystyrene standard according to ASTM D6579-11 (performed using a Waters 2695 separation module with a Waters 2414 differential refractometer (RI detector); tetrahydrofuran (THF) was used as the eluent at a flow rate of 1 ml/min, and two PLgel Mixed-C (300×7.5 mm) columns were used for separation at the room temperature; weight and number average molecular weight of polymeric samples can be measured by gel permeation chromatography relative to linear polystyrene standards of 800 to 900,000 Da).

Polymer B

A polyester polymer was prepared by adding 108.43 grams of octadecanedioic acid dimethyl ester (available from Elevance Renewable Sciences (Woodbridge, IL)), 37.35 grams of 1,3-butanediol, and 0.44 grams of butyl stannoic acid to a suitable reaction vessel equipped with a stirrer, temperature probe, and Dean-Stark trap with a condenser, under a nitrogen atmosphere. The contents of the reactor were gradually heated to 210° C. with continuous removal of methanol distillate beginning at about 150° C. The temperature of the reaction mixture was held at 210° C. until about 12 grams of methanol had been collected. The contents of the reactor were cooled to 100° C. before thinning with 144.7 grams of SOLVESSO 200 (Naphtha (Petroleum) solvent, commercially available from Exxon-Mobil Corporation (Fairfax, VA)) and 96.5 grams of diacetone alcohol. The final resin solution had a measured percent solids (110° C./1 hour) of about 31.9% and a hydroxyl value of 70.2 mg KOH/g. Gel permeation chromatography was used with tetrahydrofuran solvent and polystyrene standards to determine a weight average molecular weight of 6419 g/mol.

Polymer C

A polyester polymer was prepared by adding 108.43 grams of octadecanedioic acid dimethyl ester (available from Elevance Renewable Sciences, (Woodbridge, IL)), 34.7 grams of 1,4-butanediol, and 0.45 grams of butyl stannoic acid to a suitable reaction vessel equipped with a stirrer, temperature probe, and Dean-Stark trap with a condenser, under a nitrogen atmosphere. The contents of the reactor were gradually heated to 210° C. with continuous removal of methanol distillate beginning at about 150° C. The temperature of the reaction mixture was held at 210° C. until about 15 grams of methanol had been collected. The contents of the reactor were cooled to 100° C. before thinning with 103.9 grams of SOLVESSO 200 and 69.3 grams of diacetone alcohol. The final resin solution had a measured percent solids (110° C./1 hour) of about 31.4%, and a hydroxyl value of 44.4 mg KOH/g.

Polymer D

A polyester polymer was prepared by adding 108.43 grams of octadecanedioic acid dimethyl ester (available from Elevance Renewable Sciences (Woodbridge, IL)), 33.62 grams of 1,3-butanediol, 3.74 grams of 1,4-butanediol and 0.44 grams of butyl stannoic acid to a suitable reaction vessel equipped with a stirrer, temperature probe, and Dean-Stark trap with a condenser, under a nitrogen atmosphere. The contents of the reactor were gradually heated to 210° C. with continuous removal of methanol distillate beginning at about 150° C. The temperature of the reaction mixture was held at 210° C. until about 15 grams of methanol had been collected. The contents of the reactor were cooled to 100° C. before thinning 181.21 grams of SOLVESSO 200 and 121.00 grams of diacetone alcohol. The final resin solution had a measured percent solids (110° C./1 hour) of about 26.6%, and a hydroxyl value of 62.4 mg KOH/g. Gel permeation chromatography was used with tetrahydrofuran solvent and polystyrene standards to determine a weight average molecular weight of 7542 g/mol.

Polymer E

A polyester polymer was prepared by adding 108.43 grams of octadecanedioic acid dimethyl ester (available from Elevance Renewable Sciences (Woodbridge, IL)), 34.7 grams of 1,4-butanediol, and 0.45 grams of butyl stannoic acid to a suitable reaction vessel equipped with a stirrer, temperature probe, and Dean-Stark trap with a condenser, under a nitrogen atmosphere. The contents of the reactor were gradually heated to 210° C. with continuous removal of methanol distillate beginning at about 150° C. The temperature of the reaction mixture was held at 210° C. until about 15 grams of methanol had been collected.

Polymer F

A polyester polymer was prepared by adding 48.56 grams of 1,12 dodecanedioic acid (available Wego Chemical Group (Great Neck, NY)), 22.00 grams of 1,4-butanediol, and 0.20 grams of butyl stannoic acid to a suitable reaction vessel equipped with a stirrer, temperature probe, and Dean-Stark trap with a condenser, under a nitrogen atmosphere. The contents of the reactor were gradually heated to 210° C. with continuous removal of water distillate beginning at about 150° C. The temperature of the reaction mixture was held at 210° C. for 2 hours. The final resin solution had a measured percent solids (110° C./1 hour) of 97.84%, and a hydroxyl value of 52.2 mg KOH/g. Gel permeation chromatography was used with tetrahydrofuran solvent and polystyrene standards to determine a weight average molecular weight of 6630 g/mol.

Examples 1-5

Preparation of Conductive Polymer Compositions

The conductive polymer compositions of Examples 1-4 and Comparative Example 5 were prepared using the components shown in Table 1. Amounts listed in Table 1 are in parts by weight.

TABLE 1

| Component | Ex. 1 | Ex. 2 | Ex. 3 | Ex. 4 | Comp. Ex. 5 |
|---|---|---|---|---|---|
| SOLVESSO 200[1] | 48.5 | 42.3 | 61.4 | 62.7 | 61.4 |
| Diacetone Alcohol | 32.3 | 28.2 | — | — | — |
| Polymer A | 9.0 | — | 22.8 | — | — |
| Polymer E | — | — | — | 23.3 | — |
| Polymer F | — | 15.7 | — | — | — |
| POLYWAX 70[2] | — | — | — | — | 22.8 |

TABLE 1-continued

| Component | Ex. 1 | Ex. 2 | Ex. 3 | Ex. 4 | Comp. Ex. 5 |
|---|---|---|---|---|---|
| KRATON G[3] | 2.3 | — | 3.5 | 3.6 | 3.5 |
| MONARCH 120[4] | 7.6 | 13.2 | 11.4 | 10 | 11.4 |
| VULCAN XC 72R[5] | 0.3 | 0.6 | 0.9 | 0.4 | 0.9 |

[1] solvent naphtha available from Exxon Mobile Corporation (Fairfax, VA)
[2] a polyethylene wax with a melting temperature of 69° C. available from Baker Hughes (Houston, TX)
[3] a styrenic thermoplastic block copolymer available from Kraton Corporation (Houston, TX)
[4] a specialty carbon black available from Cabot Corporation (Billerica, MA)
[5] a specialty carbon black available from Cabot Corporation (Billerica, MA)

Test Methods A and B

Each of the conductive polymer compositions from Examples 1-5 were prepared and subsequently subjected to testing using either Test Method A or Test Method B, as follows.

Test Method A: The solvent components from Table 1 were prepared in a polyethylene 8 oz. cup. The polymer components were added under medium shear utilizing a four blade impeller. Once the polymer components were completely added, the air mixer was placed on high shear until the polymer components completely dissolved in the solvent components. The carbon black components were added to the sample under medium shear. The test sample of the conductive polymer compositions were then three roll milled. A silver ink was printed utilizing an 80 durometer hand squeegee on a polyester screen. The silver was dried at 145° C. for 10 minutes. The conductive polymer compositions were printed over top of the PTC silver traces utilizing an 80 durometer hand squeegee. The conductive polymer compositions were dried at 145° C. for 3 minutes. A digital thermometer (TRACEABLE 4000) was placed in a laboratory oven (DESPATCH LFC1-38-8) in order to give real time temperature readings. A FLUKE 1587 FC multimeter was connected via large alligator clips to the test circuit and placed into the oven. The oven temperature was started at 30° C. with a set end temperature of 145° C., and the oven was started. At every 5° C. interval between 30° C. and 130° C., a recording of the resistance was taken. Results are shown in Table 2.

Test Method B: Polymer components and solvent components from Table 1 were placed in a 2-4 oz. glass jar and placed in a laboratory oven at 90° C. until the polymer components had completely dissolved. The jars were removed from the oven and their contents were transferred to a plastic cup. An appropriate amount of carbon black components were added under medium shear utilizing a four blade impeller. A glass microscope slide was taped off using 3M 201+ masking tape (available from 3M (Maplewood, MN)) so that roughly 0.5 inches of draw down space was left in the middle of the slide. The test samples were drawn down on the glass slide using a wooden tongue depressor and put in an oven at 145° C. for 10 minutes. A digital thermometer (TRACEABLE 4000) was placed in a laboratory oven (DESPATCH LFC1-38-8) in order to give real time temperature readings. A FLUKE 1587 FC multimeter was connected via large alligator clips to the test material on the glass slide and placed into the oven. The oven temperature was started at 30° C. with a set end temperature of 145° C., and the oven was started. At every 5° C. interval between 30° C. and 130° C., a recording of the resistance was taken. Results are shown in Table 2.

In addition, the following parameters were determined for each of Examples 1-5, which results are shown in Table 2 (below).

Pigment to Binder Ratio (P:B): the sum of pigment components (MONARCH 120, VULCAN XC 72R) divided by the sum of the binder component (polymer components) (C18-PG, C18-BDO, C12-BDO, POLYWAX 70, KRATON G).

Steepest Rise: the slope in 1/° C. of the steepest point in the normalized resistance vs. temperature plot. Normalized resistance is defined as the measured resistance at a given temperature in $\Omega$ divided by the initial resistance at 25° C. in $\Omega$.

Temperature for Steepest Rise: the temperature at which the next data point is recorded for following the segment with the steepest slope in 1/° C. in the normalized resistance vs. temperature plot.

R45° C./R25° C.: the ratio of the resistance in $\Omega$ at 45° C. to the resistance in $\Omega$ at 25° C., using the equation ((R(tempC)/R25C)−1) to normalize the ratio at 25° C. to 0.

R65° C./R25° C.: the ratio of the resistance in $\Omega$ at 65° C. to the resistance in $\Omega$ at 25° C., using the equation ((R(tempC)/R25C)−1) to normalize the ratio at 25° C. to 0.

R85° C./R25° C.: the ratio of the resistance in $\Omega$ at 85° C. to the resistance in $\Omega$ at 25° C., using the equation ((R(tempC)/R25C)−1) to normalize the ratio at 25° C. to 0.

Loop Resistance: the resistance in $\Omega$ at 25° C.

Figure 2:
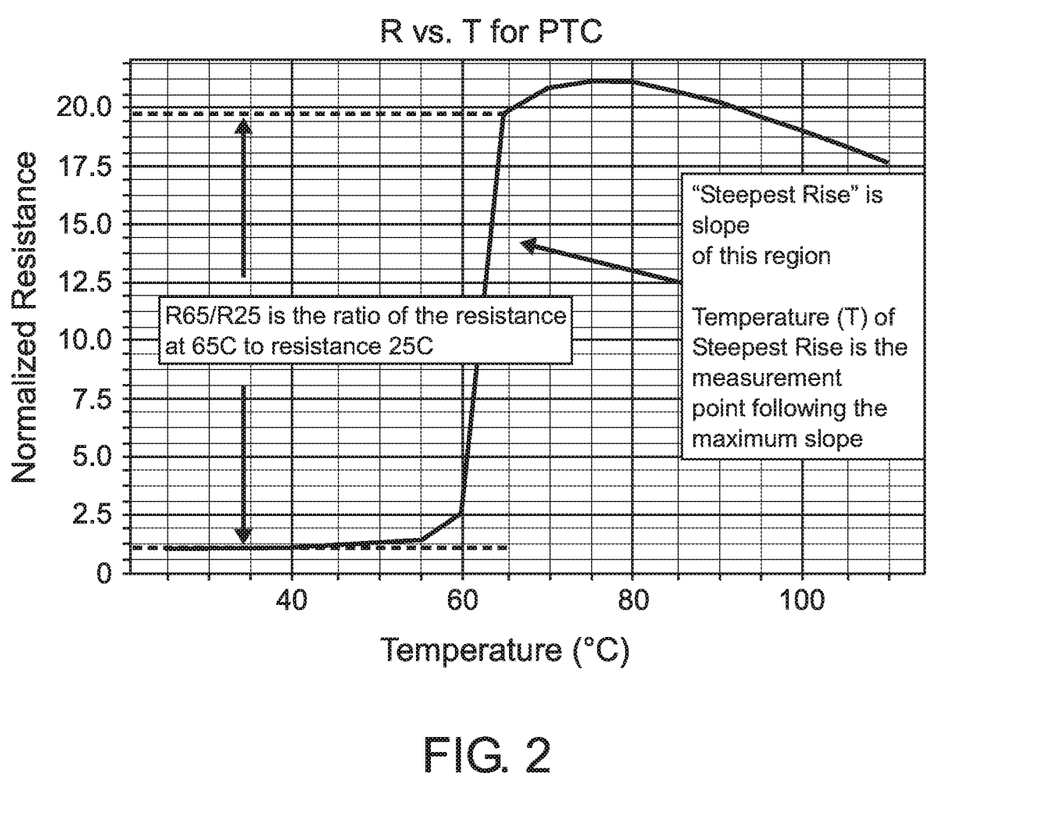
FIG. 2 shows a graph of Normalized Resistance v. Temperature for a conductive polymer composition having a trip temperature.

Referring to FIG. 2, an exemplary graph of normalized resistance v. temperature is shown to further illustrate the above-defined R65° C./R25° C., Steepest Rise, and Temperature for Steepest Rise parameters described above.

TABLE 2

| Example | Test Method | P:B | Steepest Rise | Trip Temperature | $R_{65°C.}/R_{25°C.}$ | $R_{85°C.}/R_{25°C.}$ | Loop Resistance |
|---|---|---|---|---|---|---|---|
| 1 | A | 0.70 | 7.9 | 60 | 20 | — | 890 |
| 2 | A | 0.87 | 0.52 | 60 | 47 | — | 110 |
| 3 | B | 0.47 | 1800 | 60 | 240 | — | 39000 |
| 4 | B | 0.39 | 39 | 75 | — | 130 | 8300 |
| CE5 | A | 0.47 | — | 80 | 5 | 27 | 1354 |

Examples 6-10

Preparation of Conductive Polymer Compositions

Conductive polymer compositions were prepared for Examples 6-9 and Comparative Example 10 by combining the components from Table 3 as follows. The polymer(s) and the rheological modifier were combined with SOLVESSO 200 and diacetone alcohol solvent. The polymer components were dissolved using an air mixer with a 4 blade impeller until the sample was completely homogeneous. Carbon Blacks were added to the polymer solutions and mixed gently on a rotary mixer until the solutions fully wetted the carbon. All inks were milled using a Keith Machinery Corporation three-roll mill.

All amounts shown in Table 3 are in grams.

TABLE 3

|  | Ex. 6 | Ex. 7 | Ex. 8 |
| --- | --- | --- | --- |
| SOLVESSO 200[1] | 12.22 | 0.87 | — |
| Diacetone Alcohol | 8.15 | 0.58 | — |
| PEARLBOND 223[6] | 1.85 | — | — |
| Polymer A | 2.78 | — | — |
| Polymer B | — | 21.16 | — |
| Polymer C | — | 2.39 | — |
| Polymer D | — | — | 30 |
| MONARCH 120[4] | 4.01 | 6.48 | 6.90 |
| VULCAN XC 72R[5] | 0.16 | 0.27 | 0.28 |

[6]a rheology modifier available from The Lubrizol Corporation (Wickliffe, OH)

Each of the conductive polymer compositions from Examples 6-10 were prepared and subsequently subjected to testing using Test Method A. Results are shown in Table 4.

In addition, the following parameters were determined for each of Examples 1-5, which results are shown in Table 4 (below).

Viscosity at 10 RPM and at 20 RPM were measured using a BYK CAP 2000+ viscometer at 25° C. using Spindle 1 after 15 seconds.

TABLE 4

|  | Ex. 6 | Ex. 7 | Ex. 8 |
| --- | --- | --- | --- |
| Viscosity (cP) at 10 RPM | 1293.7 | 2343.7 | 1068 |
| Viscosity (cP) at 20 RPM | 900 | 1453 | 666 |
| $R_{45° C.}/R_{25° C.}$ | — | 10.15 | 21.96 |
| $R_{65° C.}/R_{25° C.}$ | 15.17 | — | — |
| Electrical Volume Resistivity (kΩ/sq/mil) | 1.53 | 2.02 | 2.17 |

Whereas particular embodiments of this invention have been described above for purposes of illustration, it will be evident to those skilled in the art that numerous variations of the details of the present invention may be made without departing from the invention as defined in the appended claims.

The invention claimed is:

1. An electrically or thermally conductive polymer composition, comprising:
   a polyester polymer having a backbone comprising at least 12 consecutive carbon atoms between ester linkages; and
   conductive particles dispersed in the polyester polymer, wherein the polyester polymer and the conductive particles are dispersed in a solvent, and wherein the solvent exhibits a Hansen solubility parameter of from 17.0 to 21.5 $(J/cm)^{1/2}$.

2. The conductive polymer composition of claim 1, wherein the conductive polymer composition exhibits a trip temperature in a range between 20° C. and 120° C., wherein the trip temperature is a temperature at which a maximum slope is exhibited in a graph of normalized resistance over temperature for the conductive polymer composition.

3. The conductive polymer composition of claim 1, wherein the backbone comprises at least 18 consecutive carbon atoms.

4. The conductive polymer composition of claim 1, wherein the polyester polymer comprises at least 10 weight percent of solids of the conductive polymer composition.

5. The conductive polymer composition of claim 1, wherein the polyester polymer has a linear structure.

6. The conductive polymer composition of claim 1, wherein the polyester polymer comprises a non-aromatic polyester.

7. The conductive polymer composition of claim 1, wherein the polyester polymer comprises a saturated polyester.

8. The conductive polymer composition of claim 1, wherein the polyester polymer comprises a semi-crystalline polyester.

9. The conductive polymer composition of claim 1, wherein the polyester polymer comprises a polyester polyol polymer or a polyester polyacid polymer.

10. The conductive polymer composition of claim 1, wherein the polyester polymer is a reaction product of a polyol and a diacid or diester comprising an at least 12 consecutive carbon atom chain.

11. The conductive polymer composition of claim 1, wherein the conductive particles comprise conductive carbon.

12. The conductive polymer composition of claim 1, wherein the polyester polymer comprises a bio-based polyester.

13. The conductive polymer composition of claim 1, wherein the polyester polymer comprises a first polyester polymer having a backbone comprising at least 12 consecutive carbon atoms between ester linkages and a second polyester polymer having a backbone comprising at least 12 consecutive carbon atoms between ester linkages, wherein the first polyester polymer is different from the second polyester polymer.

14. The conductive polymer composition of claim 1, wherein the polyester polymer is a reaction product of a plurality of polyols and a diacid or diester.

15. A component comprising an electrically or thermally conductive polymer composition, comprising:
   two electrodes; and
   an electrically or thermally conductive polymer composition in electrical communication with the two electrodes, the conductive polymer composition comprising:
      a polyester polymer having a backbone comprising at least 12 consecutive carbon atoms between ester linkages; and
      conductive particles dispersed in the polyester polymer, wherein the polyester polymer and the conductive particles are dispersed in a solvent, and wherein the solvent exhibits a Hansen solubility parameter of from 17.0 to 21.5 $(J/cm)^{1/2}$.

16. The component of claim 15, wherein the component comprises a heating element or an overcurrent protection element.

17. The component of claim 16, wherein the heating element or overcurrent protection element comprises a vehicle component, an architectural component, clothing, a mattress, a sealant, a battery enclosure, a medical component, a heating pad, a fabric and/or an electrical component.

18. The component of claim 15, further comprising a power source in electrical communication with the two electrodes.

19. The component of claim 15, wherein the backbone comprises at least 18 consecutive carbon atoms.

20. The component of claim 15, wherein the polyester polymer comprises at least 10 weight percent of solids of the conductive polymer composition.

21. A method for self-regulating a temperature of a component, comprising:
- providing a component comprising an electrically or thermally conductive polymer composition, the component comprising:
  - two electrodes; and
  - an electrically or thermally conductive polymer composition in electrical communication with the two electrodes, the conductive polymer composition comprising:
    - a polyester polymer having a backbone comprising at least 12 consecutive carbon atoms between ester linkages; and
    - conductive particles dispersed in the polyester polymer, wherein the polyester polymer and the conductive particles are dispersed in a solvent, and wherein the solvent exhibits a Hansen solubility parameter of from 17.0 to 21.5 $(J/cm)^{1/2}$.

22. The method of claim 21, further comprising flowing a current through the electrically conductive polymer composition.

23. The method of claim 21, further comprising screen printing the conductive polymer composition onto a substrate.

\* \* \* \* \*